United States Patent [19]
Gourdin et al.

[11] Patent Number: 5,913,162
[45] Date of Patent: Jun. 15, 1999

[54] CELL TEST IN A CELLULAR TELECOMMUNICATION NETWORK

[75] Inventors: André Gourdin, Rambouillet; Jean-Louis Bosc, Villeurbanne; Kamal Ladran, Aulnay-Sous-Bois, all of France

[73] Assignee: France Telecom, Paris, France

[21] Appl. No.: 08/749,136

[22] Filed: Nov. 14, 1996

[30] Foreign Application Priority Data

Nov. 15, 1995 [FR] France .................................. 95 13621

[51] Int. Cl.⁶ .................................................. H04Q 7/34
[52] U.S. Cl. .......................................... 455/424; 455/67.4
[58] Field of Search .................... 455/423, 424, 455/67.4

[56] References Cited

U.S. PATENT DOCUMENTS

| | | | |
|---|---|---|---|
| 4,443,661 | 4/1984 | Kubo | 455/424 |
| 5,357,557 | 10/1994 | Sakakura | 455/424 |
| 5,425,076 | 6/1995 | Knippelmier | 379/27 |
| 5,481,588 | 1/1996 | Rickli et al. | 455/423 |

*Primary Examiner*—Andrew M. Dolinar
*Attorney, Agent, or Firm*—Lowe Hauptman Gopstein Gilman & Berner

[57] ABSTRACT

To test a cell in a cellular telecommunication network, a test mobile station is placed in the network near the cell and a server is connected to fixed communication devices of the network via a switched telephone network. The cell is confirmed to be operating correctly if a first call requested by the server to the test mobile station is set up and then cleared down by the test mobile station after first parameters transmitted by the server are received in the test mobile station, and thereafter if a second call requested by the test mobile station to the server via the cell under test is set up and then cleared down by the test mobile station after second parameters emitted by the test mobile station are received in the server. If this is not the case, the server reports incidents during the first or second call.

11 Claims, 7 Drawing Sheets

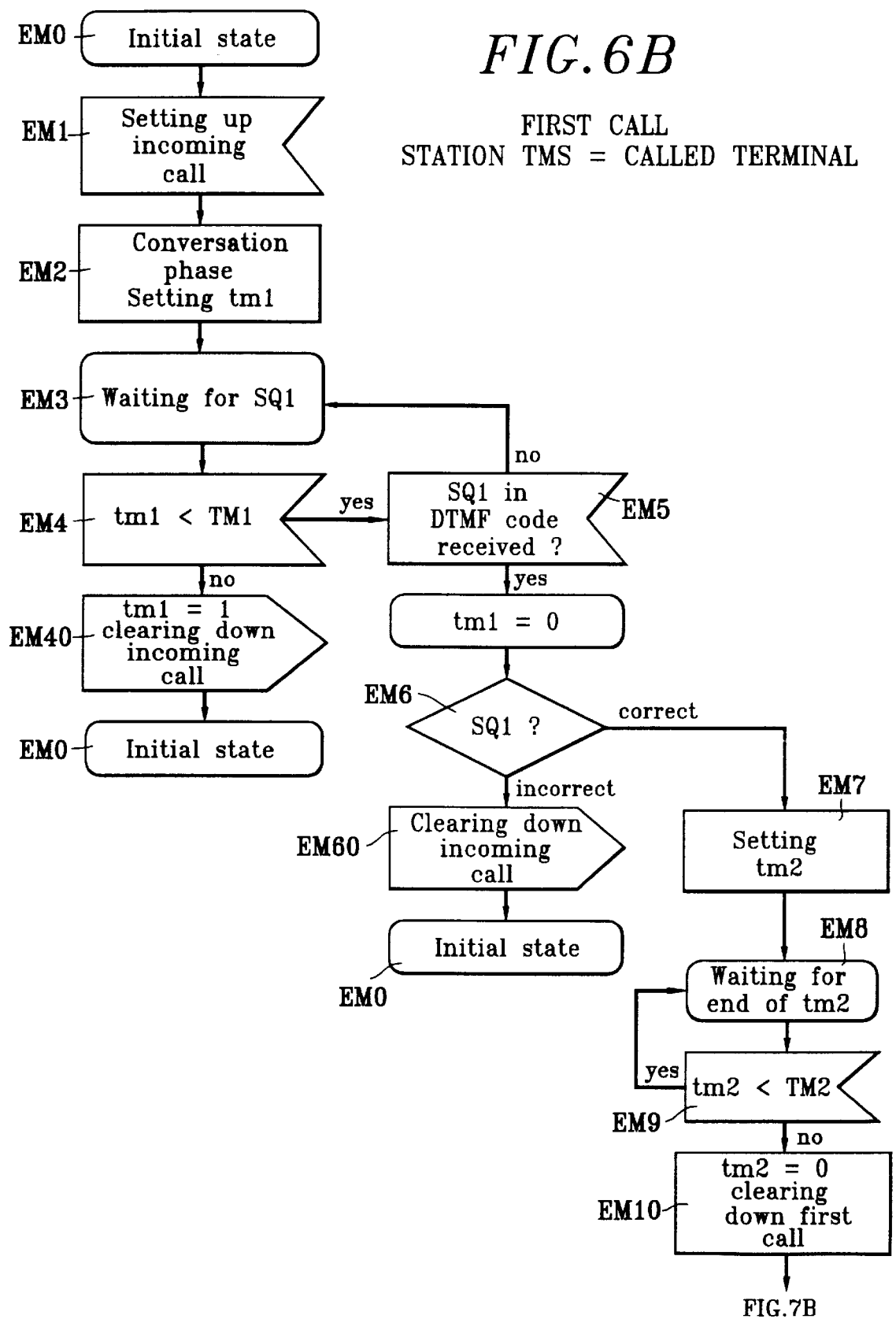

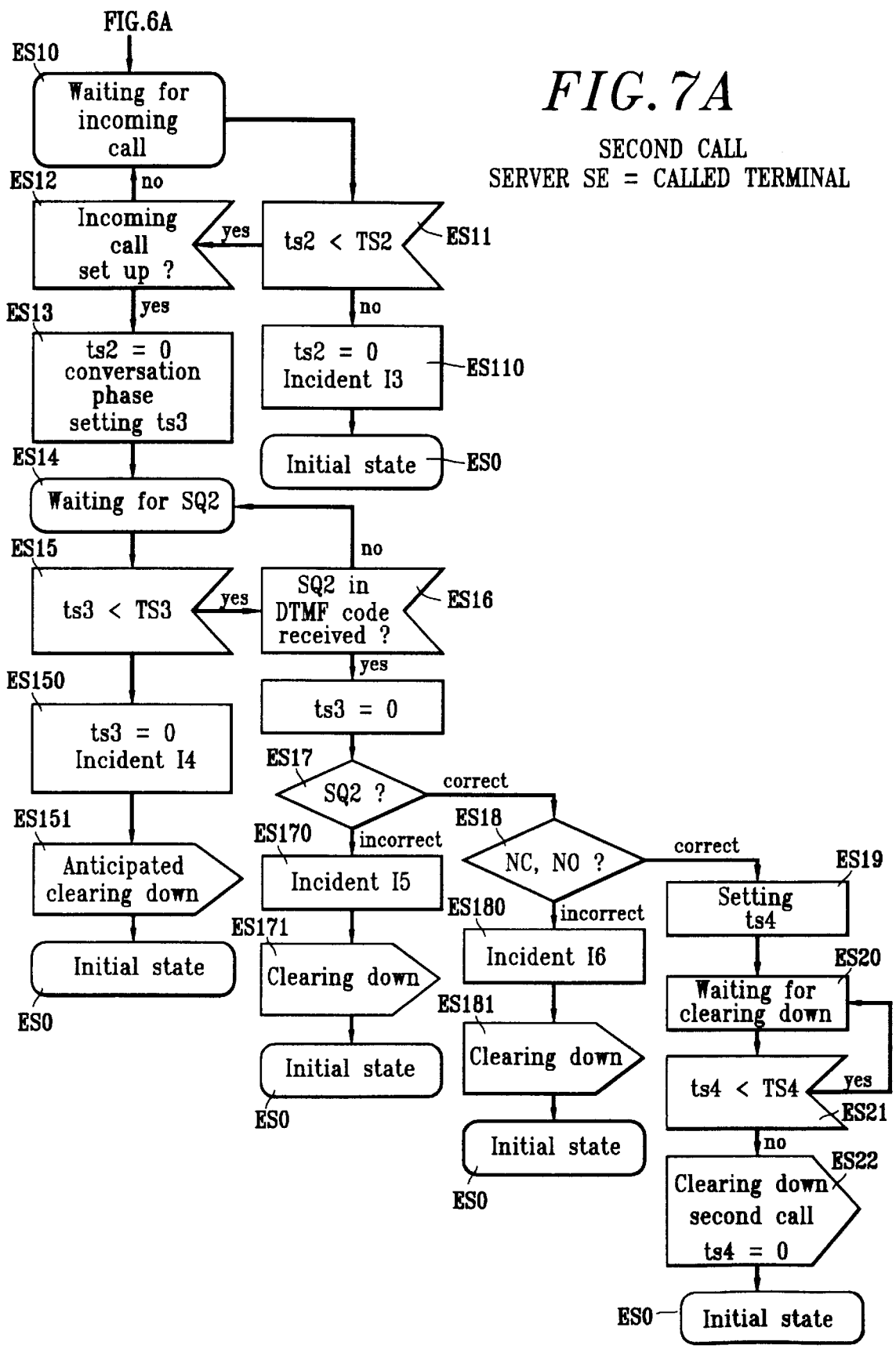

SECOND CALL
STATION TMS = CALLING TERMINAL

CELL TEST IN A CELLULAR TELECOMMUNICATION NETWORK

BACKGROUND OF THE INVENTION

1—Field of the Invention

The present invention concerns testing at least one cell in a cellular telecommunication network, in particular to detect malfunctions in fixed communication means serving said cell.

2—Description of the Prior Art

A cellular telecommunication system includes mobile stations and fixed communication means. The fixed communication means further comprise fixed base transceiver stations to each of which are allocated radio communication channels for exchanging digital information with mobile stations spread around the cells of the network. At least one signalling radio channel carries protocol signalling signals for setting up and clearing down calls between mobile stations and telephone terminals connected to the fixed communication means via the switched telephone network. The fixed communication means also comprise controllers, switching centers, location registers and transmission media for digital information and telephone signals thereby switching calls requested by the mobile stations and addressed to the mobile stations, locating the mobile stations in the network and managing the traffic in the cellular telecommunication network.

In cellular telecommunication networks as defined hereinabove, malfunctions of means directly associated with transmitting and receiving calls in a given cell are not detected by supervisory and maintenance means included in the cellular telecommunication network. For example, an irregularity during a call with a mobile station in a given cell is not reported. More generally, no supervisory means are currently provided for detecting any untimely termination or clearing down during the setting up, the conversation phase or the release of an outgoing or incoming call.

OBJECT OF THE INVENTION

The main object of this invention is to test a cell in a cellular telecommunication network in order to detect incidents occurring during a call through the fixed base station associated with said cell, whilst continuing to support the normal traffic in the network.

SUMMARY OF THE INVENTION

Accordingly, there is provided a method of testing a cell in a cellular telecommunication network comprising fixed communication means serving a plurality of base transceiver stations respectively associated with cells of the network, a test mobile station being placed in the cellular telecommunication network, and a terminal means being connected to the fixed communication means, the method comprising the following steps:

setting up a first call requested by the terminal means between the terminal means and the test mobile station, transmitting first parameters from the terminal means to the test mobile station if the first call is set up, clearing down the first call by the test mobile station if the first parameters are received in the test mobile station, setting up a second call requested by the test mobile station between the test mobile station and the terminal means via the cell after the first call is cleared down, emitting second parameters from the test mobile station to the terminal means if the second call is set up, and clearing down the second call if the second parameters are received in the terminal means.

In accordance with the invention, the correct operational status of the cell under test is considered by the terminal means when all said following steps mentioned hereinabove are effected successively without incident. Briefly, the operational status of the cell under test is deemed to be correct if the test mobile station placed in the cell under test sets up and clears down the second call normally in response to the clearing down of the first call requested by the terminal means.

On the other hand, if an electronic resource associated with emission and/or reception of calls in the cell under test is faulty, one of said following steps mentioned hereinabove is not effected or is effected only in part, and the other steps following said one step are never effected. In accordance with the invention, the terminal means terminates or clears down the call in progress, i.e. the first call or the second call during which electronic resource becomes faulty, in response to at least one of the following incidents:

failure to set up the first call, absence of clearing down of the first call after expiry of a first time-delay set after the step of transmitting the first parameters, failure to set up the second call after expiry of a second time-delay set after the step of clearing down the first call, absence of reception of the second parameters after expiry of a third time-delay set after the step of setting up the second call, and error in the second parameters received in the terminal means.

An error detected in the second parameters received by the terminal means can be one of the following errors:

incorrect number of digits representing one of the second parameters, erroneous digit preceding or following one of the second parameters, and an erroneous parameter out of said second parameters.

Preferably, the terminal means cyclically executes said following steps mentioned hereinabove to test the cell under test periodically, cumulatively counts occurrences of each of said following incidents thereby providing cumulative counts of incident occurrences and produces an alarm if one of the cumulative counts exceeds a predetermined number during a predetermined period. The predetermined number and the predetermined period are chosen beforehand on the basis of traffic failure statistics for the cell under test so that short-lived incidents that do not require the intervention of a maintenance team are not reported.

The test mobile station also participates in the detection of failure of electronic resources relating to emission and/or reception of calls in the cell under test, either during the first call or during the second call.

According to the invention, the mobile station clears down the first call notably in response to any of the following events:

absence of reception of the first parameters after expiry of a predetermined time-delay set by the test mobile station after the step of setting up the first call, and an error in one of the first parameters received in the test mobile station.

Also according to the invention, the mobile station clears down the second call notably in response to any of the following events:

anticipated termination of the second call before the step of emitting the second parameters from the test mobile station, and expiry of a predetermined time-delay set by the test mobile station after the step of emitting the second parameters.

At least one of the first parameters received correctly by the test mobile station can be one of the second parameters emitted from the test mobile station. In this way the terminal means can verify the correct transmission of data to and from the test mobile station, in particular over a radio channel between the test mobile station and the base transceiver station associated with the cell under test, by comparing the first parameter retransmitted by the test mobile station during the conversation phase of the second call with the first parameter initially transmitted by the terminal means during the conversation phase of the first call.

The first parameters transmitted by the terminal means advise the test mobile station, among other things, of the cell under test, via which the second call must be set up, and the called party, i.e. the terminal means, to be called for the second call, and optionally a test to be carried out. The second parameters emitted by the test mobile station serve to confirm to the terminal means the busying of the cell under test. According to the invention, the first parameters can include at least one of the following numbers: a number of the cell under test, a telephone number of the terminal means, a predetermined number identifying the terminal means and a number identifying said first call; and the second parameters can include at least one of the following numbers: the number of the cell under test, the predetermined number identifying the terminal means, and the number identifying said first call.

The first parameters can be transmitted from the terminal means in the form of a sequence of digits in multifrequency code, and the second parameters can be emitted by the test mobile station in the form of a sequence of digits in multifrequency code. The transmit and receive means marking out the routes taken by the first and second calls between the terminal means and the test mobile station are then transparent to the parameters, like the normally transmitted speech signals during the conversation phase of a call relating to a mobile station of the network.

Preferably, the terminal means is connected via the switched telephone network to the fixed communication means, to supervise many cells in different location areas of the network. However, the terminal means could be connected, for example, to a single switching center of the network to supervise only the corresponding location area.

In this case, the terminal means can execute cyclically said following steps mentioned hereinabove for predetermined cells to be tested in the cellular telecommunication network.

BRIEF DESCRIPTION OF THE DRAWINGS

The foregoing and other objects, features and advantages of the invention will be apparent from the following detailed description of several embodiments of the invention with reference to the corresponding accompanying drawings in which:

FIG. 6B shows a step algorithm executed by the test mobile station during the first call;

FIG. 7A shows a step algorithm executed by the server during the second call.

DESCRIPTION OF THE PREFERRED EMBODIMENTS

Figure 1:
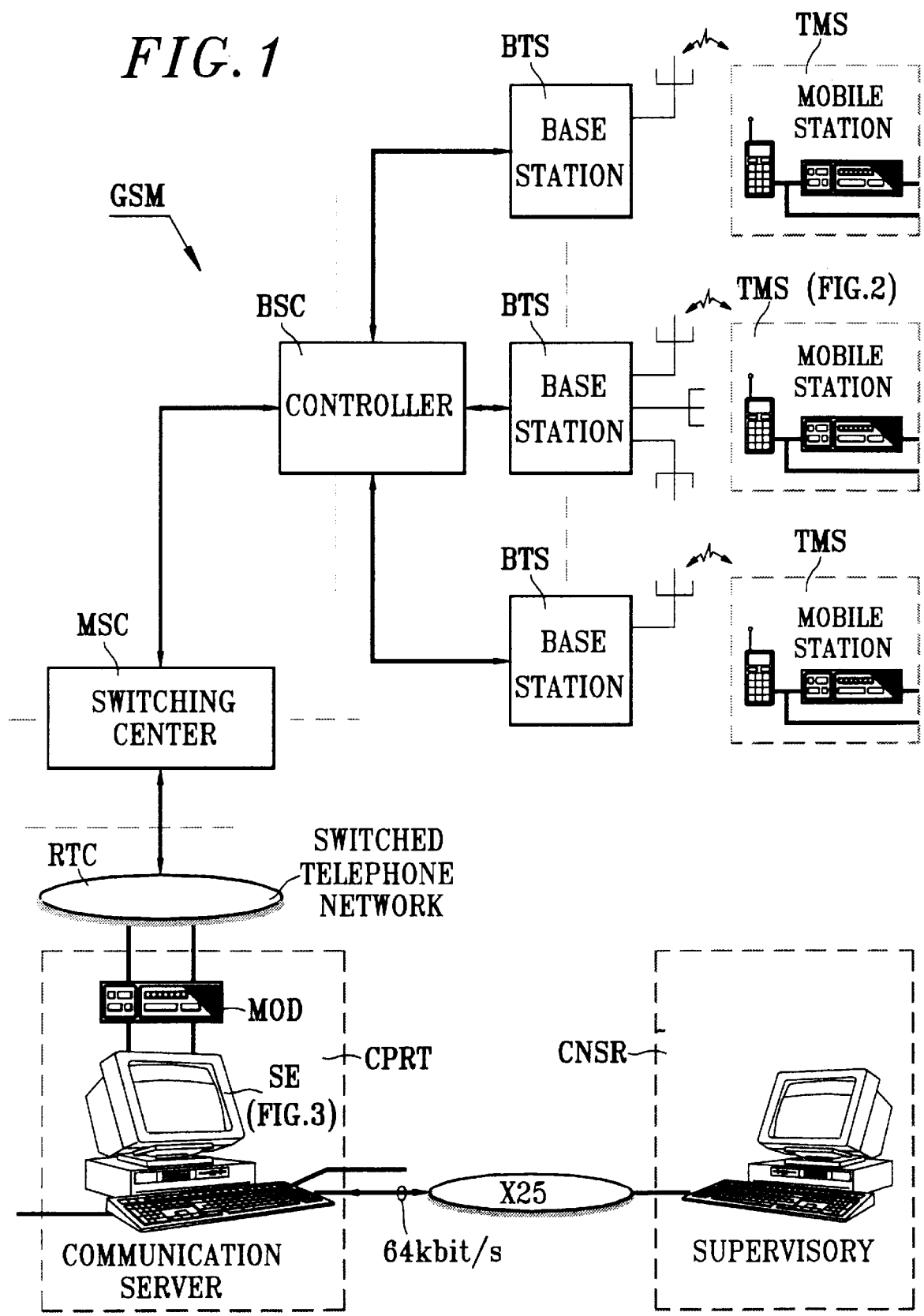
FIG. 1 is a block diagram of a prior art cellular telecommunication network in which terminal means, hereinafter called the server, and test mobile stations for implementing the test method of the invention are installed.

FIG. 1 shows by way of non-limiting example the principal entities in the GSM (Global System for Mobile Communication) digital cellular telecommunication network defined by the ETSI (European Telecommunications Standards Institute). The entities are a Mobile Service Switching Center MSC that constitutes an interface between the GSM cellular telecommunication network and the switched telephone network RTC, a Base Station Controller BSC, and a plurality of fixed Base Transceiver Stations BTS. Each base transceiver station is generally associated with at least one area, known as a cell, within which any mobile station can communicate with the network RTC via the radio transmitter-receiver equipment of the base transceiver station.

The mobile stations shown in FIG. 1 are autonomous test mobile stations TMS specific to the invention which are in practise fixed in the GSM cellular telecommunication network and are placed, for example, near base transceiver stations BTS associated with respective cells under test.

To implement the cell test method of the invention, at least one terminal means in the form of a server SE is installed in a main radiotelephone center CPRT and connected via a modem MOD to the switched telephone network RTC. In practise the server is cyclically connected to a few hundred pairs of base transceiver station BTS and test mobile station TMS to test the corresponding few hundred cells of the GSM cellular telecommunication network.

Figure 2:
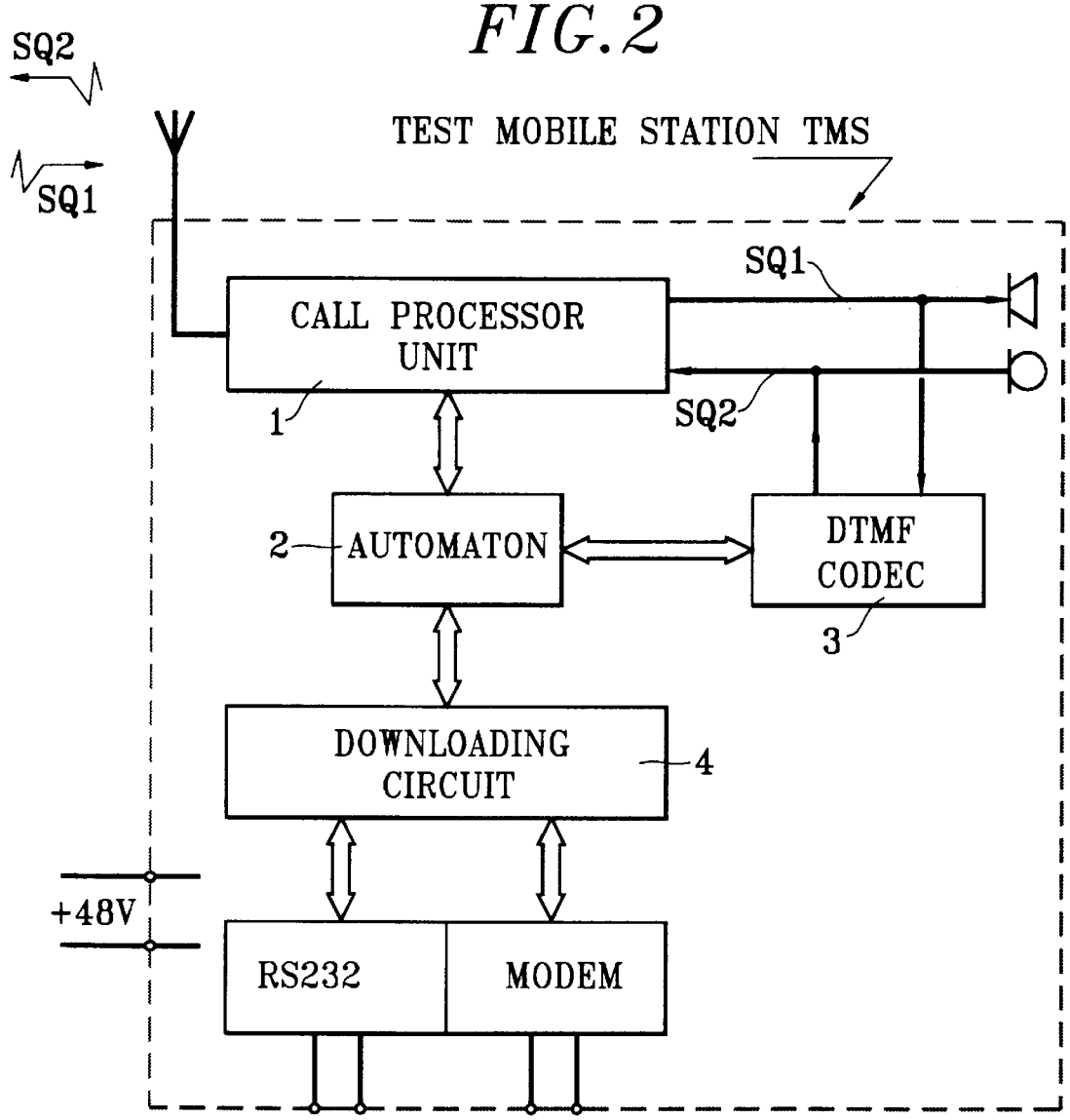
FIG. 2 is a schematic block diagram of a test mobile station.

As shown diagrammatically in FIG. 2, a test mobile station TMS specific to the invention combines in a call processor unit 1 radio receive and transmit means, radio channel selection means, signalling signal processing means and speech signal encoding and decoding means that are known in themselves in a conventional mobile station of a cellular telecommunication network, such as the GSM network in particular. A processor in the unit 1 processes the three phases of a call, namely set up, conversation and clearing down, conventionally, both for an incoming call into the test mobile station and for an outgoing call from the test mobile station. In particular, in the manner specified in the GSM Recommendations, as soon as the station TMS operates for the first time in the cell to be tested and subsequently on changing cell, the unit 1 automatically reports the location of the station TMS to central data and VRL (Visited Location Register) and HRL (Home Local Register) location area registers of the GSM network switching center.

Figure 6A:
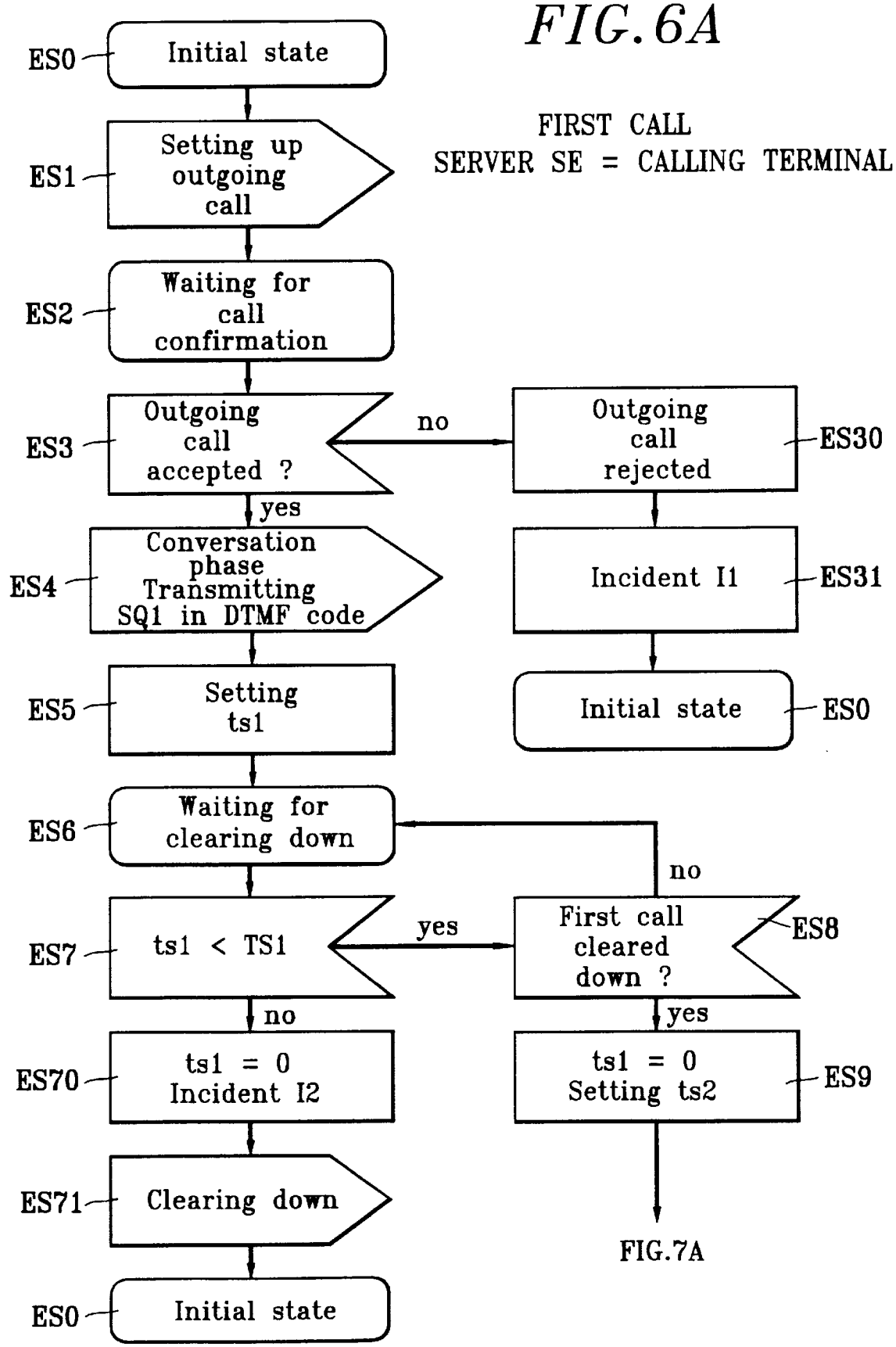
FIG. 6A shows a step algorithm executed by the server during the first call.
Figure 7B:
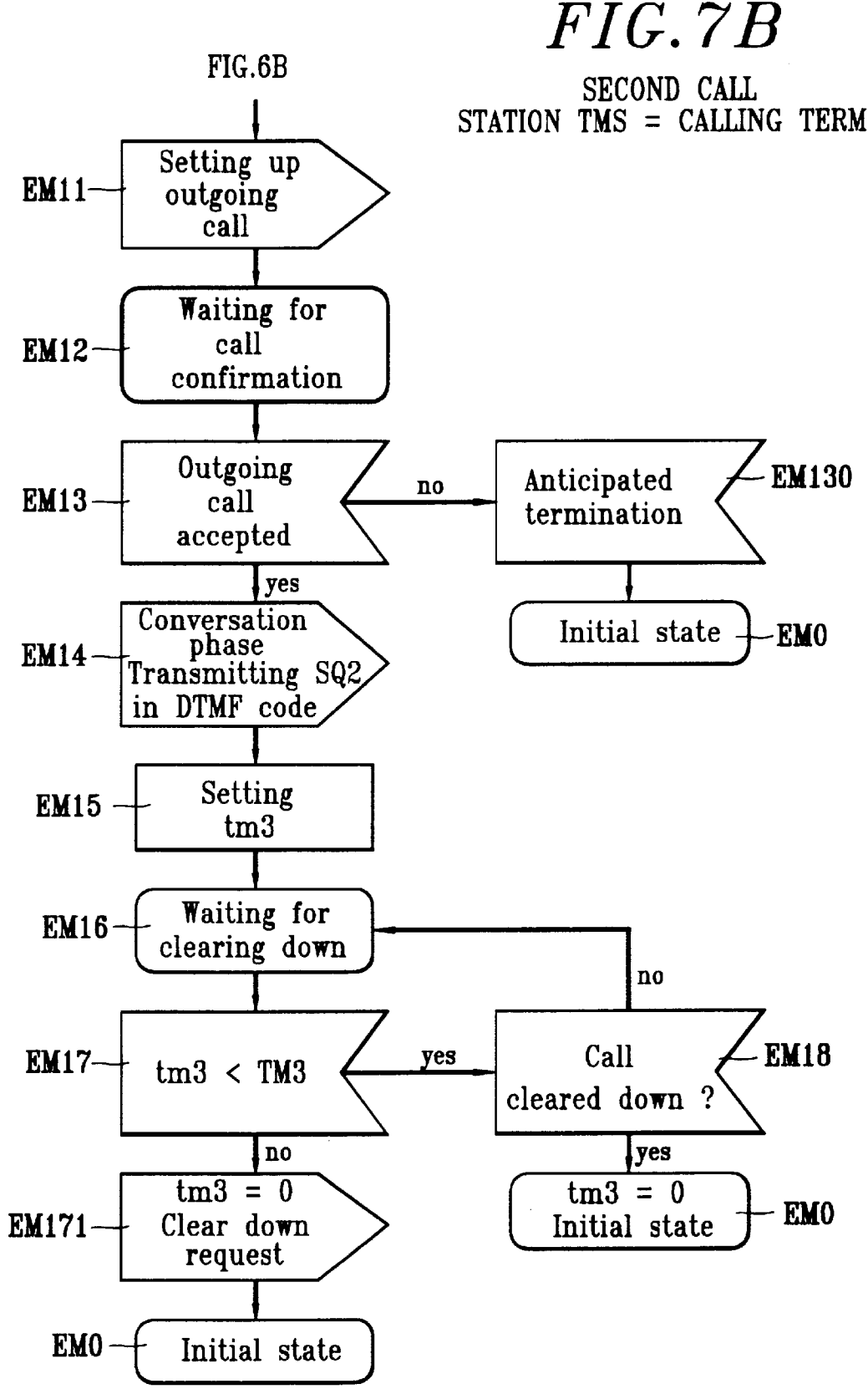
FIG. 7B shows a step algorithm executed by the test mobile station during the second call.

The test mobile station TMS also includes an automaton 2 carrying out steps EM0 through EM18 shown in FIGS. 6B and 7B to process an incoming call requested by the server SE and then an outgoing call requested by the test mobile station TMS of the invention.

The automaton 2 also controls a codec 3 for DTMF (Dual Tone MultiFrequency) encoding and decoding. A multifrequency code conventionally comprises a combination of one of three frequencies and one of four frequencies, these seven frequencies being within the audio frequency passband used in telephony. Each of the digits 0 through 9 and the characters * and # of a telephone keypad is associated with a combination of two frequencies from 12 separate frequencies. A decoder in the codec 3 is connected to the output of a digital-to-analog converter in the unit 1. An encoder in the codec 3 is connected to the input of an analog-to-digital converter in the unit 1. The digital-to-analog and analog-to-digital converters conventionally materialize the input of a loudspeaker receive channel and the output of a microphone transmit channel in a conventional mobile station. The automaton 2 activates the decoder during the conversation phase of a first call requested by the server SE to decode a first sequence SQ1 of first parameters in DTMF code to be processed by the automaton 2. The automaton 2 activates the encoder during the conversation phase of a second call requested by the test mobile station TMS after the normal clearing down of the first call to encode in DTMF code a second sequence SQ2 of second parameters to be transmitted by the automaton 2 to the server SE.

The test mobile station TMS shown in FIG. 2 optionally includes a standard RS232 output port and a modem connected to a downloading circuit 4 for downloading software or modifying functions of software already stored in the test mobile station, either by means of a portable microcomputer or via the switched telephone network. The test mobile station TMS is in practise connected to a 48 V DC supply available on the site of the associated base transceiver station BTS. The test mobile station is preferably surrounded by a screening to protect it from electromagnetic interference that may be present at some base transceiver station BTS sites.

Figure 3:
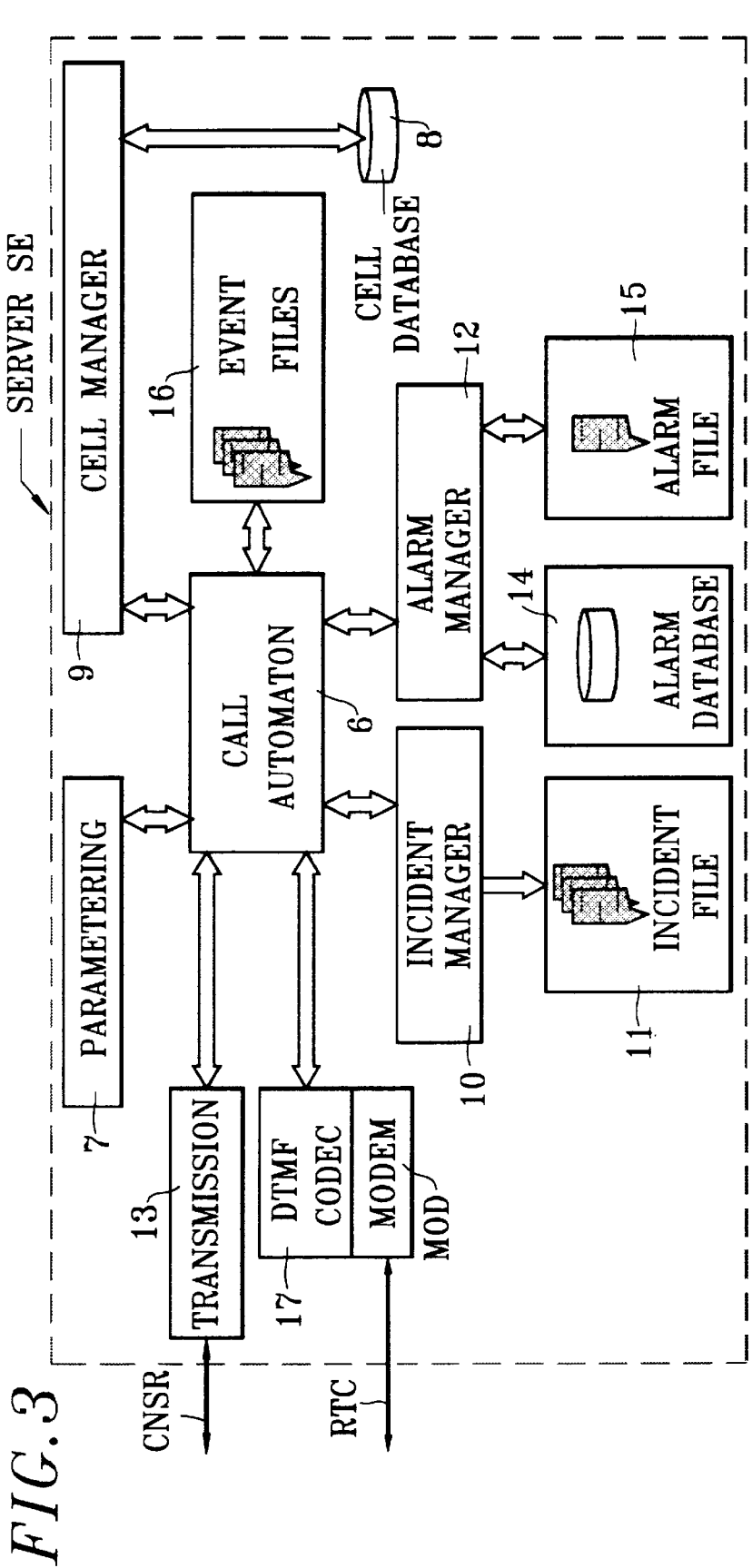
FIG. 3 is a schematic block diagram of the server.

Referring to the FIG. 3 schematic block diagram, the software elements of the server SE are organized around a call automaton 6.

The call automaton 6 is connected to a parametering circuit 7. The circuit 7 includes a predetermined two-digit number NS identifying the server SE and a ten-digit telephone number NAS of the server, together with programs for cyclic communication in accordance with the method of the invention with each of the test mobile stations TMS specific to the invention supervised by the server. For example, the server supervises a few hundred base transceiver stations BTS, either automatically during programmed time periods or manually, and can set up eight simultaneous calls via the switched telephone network RTC.

The server SE also includes a database 8 for cells under test, the cell database being controlled by a cell manager 9. For each cell under test the following information is stored in the cell database 8 and can be modified independently of each other:

a cell number NC, a cell name, a number NT for a test to be executed, a three-digit call sequence number SC lying between 0 and 255 to be included with the server number NS to constitute a call serial number NO to be transmitted by the server SE to the test mobile station TMS in the cell under test, a test mobile station telephone number stored permanently in the database 8 for an outgoing call from the server, a current repeat value of a test being conducted, and the cumulative numbers of six predetermined incidents I1 through I6 detected by the server during a plurality of successive cycles of the test method of the invention relating to the cell under test.

An incident manager 10 processes the incidents I1 through I6 for the various cells tested cyclically by the server in order to register them in an incident file 11 in which they can be classified according to the selected operating mode of the automaton 6 that may be automatic or manual, for testing the cells. For each incident the file 11 registers the date and time of the incident, the cause of the incident, the number and the name of the corresponding cell, the telephone number of the test mobile station, and the sequence number SC of the call and the type of call server to test mobile station or test mobile station to server, during which the incident occurred.

An alarm manager 12 is connected to the call automaton 6. An alarm is produced for a predetermined incident in a cell if the cumulative number of occurrences of that incident exceeds a predetermined number during a predetermined period. Alarm signals can be transmitted by the alarm manager 12 via appropriate transmission means 13 to a supervisory station installed in a national network supervisory center CNSR (FIG. 1) and connected to the server by a 64 kbit/s link via an X.25 type packet switching network, for example. The supervisory station supervises a plurality of servers SE in accordance with the invention distributed over a predetermined territory. The alarm manager 12 is associated with an alarm database 14 which stores each alarm for each cell so that the supervisory station can read the data relating to the alarm, and is associated with an alarm file 15 which stores the alarms as and when they occur with various information of the same kind as that associated with incidents.

In the server SE, an event file 16 includes a list of the cells under test, the cumulative number of incidents of each type, the cumulative number of alarms of each type, and the number of call failures broken down by the outgoing or incoming call type and by the occurrence of the failure during the call. In the automatic server operating mode, the event file 16 is updated as and when necessary for cells under test selected in the cell database 8, during a predetermined time period, for respective cell tests and for a predetermined test cycle number. In the manual server operating mode, a cell under test is selected for a particular test to be repeated as many times as is defined for that cell. The event file 16 contains for that cell test the characteristics designating the cell, the cumulative numbers of incidents and alarms and the numbers of call failures.

The server SE also includes a DTMF codec 17 associated with the modem MOD for communicating with the switching centers MSC to which it is assigned and for exchanging sequences of parameters in DTMF code with test mobile stations TMS in the location areas associated with the switching centers MSC.

The sequences transmitted by the server SE and by a test mobile station TMS are delimited by parameter delimiters corresponding to the # key of a telephone keypad. Each parameter in a sequence appears between two parameter delimiters. Each parameter is made up of digits, i.e. the digits 0 through 9 encoded by two respective frequencies in accordance with the DTMF code.

Figure 4:
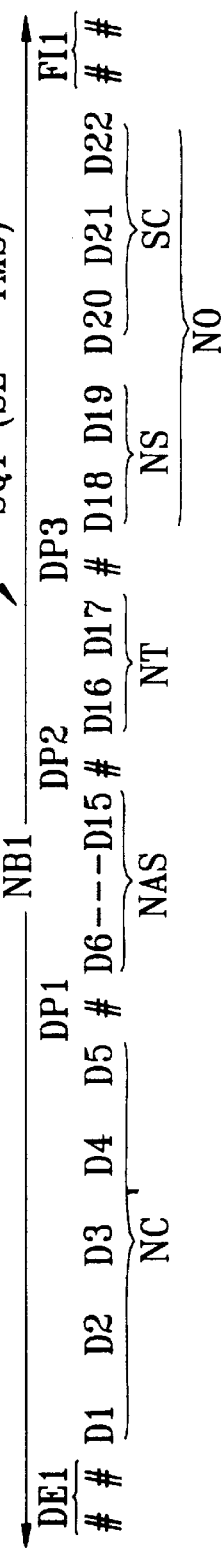
FIG. 4 shows a first sequence of first parameters in multifrequency code transmitted by the server during a first call.

As shown in FIG. 4, a first sequence SQ1 in DTMF code to be transmitted during the conversation phase of a first call in accordance with the invention from the server SE to the test mobile station TMS comprises NB1=29 digits, including two pairs of parameter delimiters marking the start DE1 and the end FI1 of the sequence SQ1. The sequence SQ1 contains four parameters.

A first parameter is equal to the number NC of the cell under test to be used by the test mobile station and is made up of five successive digits D1 through D5 between the two sequence start parameter delimiters DE1 and a first parameter delimiter DP1. A second parameter is equal to the telephone number NAS of the server SE and is made up of ten successive digits D6 through D15 between the first parameter delimiter DP1 and a second parameter delimiter DP2. A third parameter is equal to the number NT of the test to be carried out and is made up of two digits D16 and D17 between the second parameter delimiter DP2 and a third parameter delimiter DP3. A fourth parameter is equal to a call serial number NO having five digits D18 through D22 between the third parameter delimiter DP3 and the two parameter delimiters marking the end FI1 of the sequence SQ1. The call serial number NO is made up of two first digits D18 and D19 corresponding to the number NS identifying the server SE and three other digits D20, D21 and D22 corresponding to the call sequence number SC. The number SC is incremented by one unity for each outgoing call, whether set up or not, requested by the server for a given test mobile station and a given test.

Figure 5:
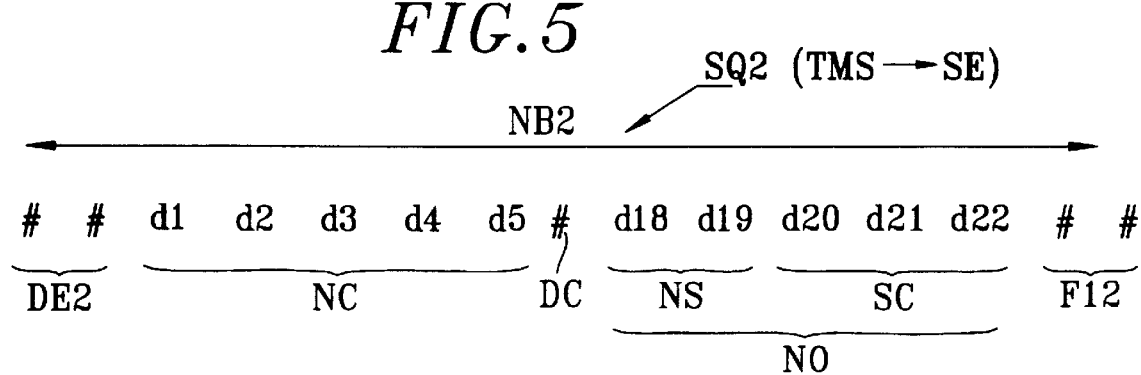
FIG. 5 shows a second sequence of second parameters in a multifrequency code transmitted by a test mobile station during a second call.

FIG. 5 shows a second sequence SQ2 in DTMF code to be transmitted by a test mobile station TMS to the server SE during the conversation phase of a second call in accordance with the invention. The sequence SQ2 is made up of NB2=15 digits, including two pairs of parameter delimiters marking the start DE2 and the end FI2 of the sequence SQ2. The sequence SQ2 comprises two parameters. A first parameter made up of five digits d1 through d5 is equal to the number NC of the cell used by the test mobile station and to be detected by the latter in the preceding first sequence SQ1. After a central parameter delimiter DC, a second parameter in the sequence SQ2 made up of five digits d18 through d22 is equal to the call serial number NO to be detected by the test mobile station at the end of the preceding first sequence SQ1.

The test method of the invention for verifying the correct operational status of a predetermined cell by the server SE involves two calls. A first call is requested by the server SE and constitutes an outgoing call for the server and an incoming call for the test mobile station TMS associated with the predetermined cell. Then, if the first call has been set up correctly, first parameters have been transmitted correctly and the first call has been cleared down correctly, the test mobile station TMS, via a cell to be tested specified by the first parameters, requests a second call that constitutes an outgoing call for the test mobile station and an incoming call for the server. Second parameters are transmitted by the station TMS during the conversation phase of the second call. The cell under test through which the test mobile station has to set up the second call is not necessarily the cell of the network through which the first call was set up.

Correct execution of the successive first and second calls with no incident indicates that the operational status of the cell under test is correct.

The first call is illustrated by steps ES0 through ES9 executed by the server SE and shown in FIG. 6A, and steps EM0 through EM10 executed by the test mobile station TMS and shown in FIG. 6B.

In the initial steps ES0 and EM0 the server and the test mobile station are idle, waiting for any call to be set up, and time-delays defined hereinafter are maintained at zero.

The first call starts with the setting up of this call in steps ES1 and EM1. Setting up the first call entails the exchange of first signalling messages in accordance with the call set-up protocol of the GSM cellular telecommunication network via the mobile service switching center MSC, the server SE being regarded as a calling terminal of the switched telephone network RTC. During the exchange of first protocol signalling messages, the server waits in step ES2 for the setting up of the first call to be completed. The conversation phase of the first call begins when the test mobile station accepts the call in step ES3 by sending a "connection" message to the center MSC, which confirms automatic channel busying, simulating an automatic off-hook in the test mobile station. The test mobile station TMS sets a first time-delay tm1 in step EM2, and the server produces and transmits the first sequence SQ1 in DTMF code in step ES4, after receiving a "confirmation" signal from the center MSC.

If the first call cannot be set up in step ES3, for any reason, the call is rejected in step ES30 by the server SE and the automaton 6 records a first incident I1 for the cell under test in the event file 16 in step ES31. The first incident I1 may be the result of incorrect or incomplete transmission of a signalling message between the mobile service switching center MSC and the test mobile station MS, to be more precise between the switching center MSC and the base transceiver station controller BSC, or between the base transceiver station controller BSC and the base transceiver station BTS, or between the base transceiver station BTS and the test mobile station TMS, during the phase of setting up the first call.

After transmitting the first sequence SQ1, the server SE sets a first time-delay ts1 that may not exceed a value TS1, pending the clearing down of the first call by the test mobile station. At the start of the time-delay ts1 the test mobile station is waiting for the first sequence SQ1 in DTMF code in step EM3. If no first sequence, correct or incorrect as hereinafter defined, is received by the test mobile station at the expiry TM1 of the time-delay tm1, the test mobile station clears down the first call in step EM40 and returns to the initial step EM0.

If the test mobile station receives a correct or incorrect first sequence SQ1 in step EM5, before the expiry TM1 of the time-delay tm1 in step EM4, the test mobile station examines the first sequence SQ1 in step EM6. A first sequence is deemed to be incorrect in particular if the five digits D1 through D5 are incorrect or different from the number NC of the cell under test, or if the three-digit call sequence number SC is lower than that contained in the first sequence previously received for a same test, for example, or if a parameter delimiter is absent or in a wrong place, or if the number of digits in the first sequence received is different from NB1.

If the received sequence SQ1 is deemed to be incorrect, the test mobile station TMS clears down the first call in step EM60 and returns to the initial step EM0.

If the first sequence SQ1 in DTMF code is deemed to be correct, the test mobile station sets a second time-delay tm2 in step EM7. In particular, the telephone number NAS of the server and the test number NT contained in the received sequence SQ1 are used by the automaton 2 to call the server at the start of the second call, via the call processor unit 1, and to carry out a particular test in the test mobile station relating to the cell under test indicated by the number NC.

As shown in the lower part of FIG. 6A, the server SE is waiting for the first call to be cleared down in step ES6, while the test mobile station TMS normally receives the first sequence SQ1 and examines it in steps EM3 through EM6. If during the subsequent steps ES7 and ES8 the server considers that the first call was not cleared down by the test mobile station before the expiry TS1 of the time-delay ts1, the server automaton 6 records a first call incident I2 in the file 16 in step E70, clears down the first call in step ES71 and returns to its initial state in step ES0.

If the server considers that the first call was cleared down before the expiry TS1 of the first time-delay ts1 in steps ES7 and ES8, the server sets a second time-delay ts2 in step ES9, awaiting an incoming call in step ES10. The clearing down reported in step ES8 is normally the result of the expiry TM2 of the time-delay tm2 in the test mobile station in steps EM8 and EM9, followed by a request to clear down the first call in accordance with the GSM protocol from the test mobile station in step EM10. The time period TM2 is in the order of 20 seconds and is required for carrying out a test. The time period TS1 is greater than TM2 and is required for examining the sequence SQ1 and for carrying out the test in the test mobile station TMS.

After step EM10, the test mobile station TMS immediately and automatically sets up the second call, through steps EM11 through EM18 shown in FIG. 7B in corresponding relationship to steps ES10 through ES22 of the server shown in FIG. 7A.

The second call is set up in step EM11 in a similar manner to that in which the first call was set up, by exchange of second signalling messages in accordance with the call set up protocol of the GSM cellular telecommunication network via the mobile service switching center MSC. The test mobile station TMS is treated as a calling terminal and the server is treated as a called terminal in the network RTC. The cell number NC contained in the first sequence SQ1 received is used by the test mobile station to select the cell under test. The telephone number NAS contained in the first sequence SQ1 received is used by the test mobile station TMS to call the server. During the exchange of second protocol signalling messages in steps EM12 and ES10 via the cell under test, the test mobile station waits to receive a "connection" signal from the switching center MSC simulating an automatic off-hook at the server, after which the server waits for a "confirmation" signal from the center MSC that confirms acceptance of the second call.

In step EM13, if the call is not accepted by any one of the means of the transmission link between the test mobile station and the server, such as the base station BS, the base station controller BSC or the mobile service switching center MSC, the test mobile station terminates the second call in step EM130 and returns to its initial state in step EM0.

If the server SE does not receive any second call confirmation before the expiry TS2 of the second time-delay ts2 in steps ES11 and ES12, it records a third incident I3 in the file 16 in step ES110 and returns to its initial state in step ES0. The incident I3 may be the result of anticipated termination of setting up the second call by the test mobile station in step EM130 or the result of the first call being cleared down in steps EM40 and EM60 before the expiry TS1 of the time-delay ts1 in steps ES7 and ES8, with no attempt to set up any second call.

If the server SE accepts the second call requested by the test mobile station in steps ES11 and ES12, the server sets a third time-delay ts3 in step ES13 and the test mobile station produces and transmits a second sequence SQ2 in DTMF code in step EM14, and then sets a third time-delay tm3 in step EM15 and waits for the second call to be cleared down in step EM16. The second sequence SQ2 contains the parameters NC and NO stored previously after reception of the first sequence SQ1.

The server then waits to receive the second sequence SQ2 in step ES14 and the test mobile station waits for the normal clearing down of the second call before the expiry TM3 of the time-delay tm3 in step EM16.

If at the expiry TS3 of the third time-delay ts3 in step ES15 the server has not received any second sequence SQ2 in DTMF code, then the automaton 6 records a fourth incident I4 in the file 16 in step ES150, prematurely clears down the second call in step ES151 and returns to its initial state in step ES0.

If the server SE receives a second sequence SQ2 in DTMF code, that may be correct or incorrect as defined hereinafter, in steps ES15 and ES16, before the expiry TS3 of the third time-delay ts3, the server examines the second sequence SQ2 in the subsequent steps ES17 and ES18. The examination of the second sequence SQ2 during the conversation phase of the second call is based on similar criteria to the examination of the first sequence SQ1 by the test mobile station in step EM6.

In step ES17 the second sequence SQ2 in DTMF code is deemed to be incorrect if there is a parameter delimiter missing between the two parameters NC and SC, or if the number of digits of the second sequence SQ2 is different from the number NB2, for example. In this case, the server automaton 6 records a fifth incident I5 in the event file 16 in step ES170, then clears down the second call in step ES171, and returns to its initial state in step ES0.

If the second sequence SQ2 is deemed to be correct in step ES17, the server examines the parameters NC and NO (NS, SC) contained in the received sequence SQ2 in step ES18. If the cell number in the sequence SQ2 is different from that NC of the cell under test, and in particular from that which was included in the first sequence SQ1 previously transmitted, the server records a sixth incident I6 in step ES180. A sixth incident I6 can also be logged in the file 16 by the automaton 6 if the second parameter, i.e., the five-digit [d18 through d22] call serial number NO contained in the second sequence SQ2, is incorrect; for example, if the two-digit server number [d18, d19] is different from the server identification number NS, or if the three-digit [d10, d21, d22] call sequence number SE differs from that [D20, D21, D22] transmitted by the server during the first call in step ES6. After logging the sixth incident I6, the server clears down the second call in step ES181 and returns to its initial state in step ES0.

The server SE sets a fourth time-delay ts4 in step ES19 after having considered that the second sequence SQ2 received is correct and contains parameters that are also correct. In step ES20, the server then waits for a clearing down of the second call that may be initiated either by the server or by the test mobile station.

As shown in the lower part of FIGS. 7A and 7B, it is assumed that the server must clear down the second call first. The maximum duration TM3 of the time-delay tm3 is greater than the maximum duration TS4 of the time-delay ts4 and is relatively long to enable the server to examine the received sequence SQ2.

The fourth time-delay ts4 normally expires in step ES21 before the expiry TM3 of the time-delay tm3 in step EM17 in the test mobile station. If the time-delay ts4 reaches its limit value TS4, the server SE clears down the second call normally in step ES22 and returns to its initial state in step ES0. This clearing down is confirmed to the test mobile station by an exchange of protocol signalling messages, commanding the clearing down of the second call in the test mobile station in step EM18, and the return of the test mobile station to the initial state in step EM0. If the third time-delay tm3 reaches its limit value TM3 in the test mobile station, the test mobile station clears down the second call in step EM170 before receiving confirmation of the clearing down of the second call by the server, and returns to its initial state in step EM0.

When the server SE has executed all steps ES0 through ES22 in succession and the test mobile station TMS has executed all steps EM0 through EM18 in succession, i.e. when no incident has been reported during the first and second calls in accordance with the invention, the server automaton 6 has no option but to confirm that the operational status of the cell under test, i.e. of the electronic means associated with the cell under test, is correct.

What we claim is:

1. A method of testing a cell in a cellular telecommunication network comprising fixed communication means serving a plurality of base transceiver stations respectively associated with cells of said network, a test mobile station being placed in said cellular telecommunication network, and a terminal means being connected to said fixed communication means, said method comprising the following steps:

setting up a first call requested by said terminal means between said terminal means and said test mobile station, transmitting first parameters from said terminal means to said test mobile station if said first call is set up, clearing down said first call by said test mobile station if said first parameters are received in said test mobile station, setting up a second call requested by said test mobile station between said test mobile station and said terminal means via said cell after said first call is cleared down, emitting second parameters from said test mobile station to said terminal means if said second call is set up, and clearing down said second call if said second parameters are received in said terminal means.

2. A method as claimed in claim 1, comprising a termination of at least one of said first call and second call by said terminal means in response to detection of at least one of the following incidents by said terminal means:

failure to set up said first call, absence of clearing down of said first call after expiry of a first time-delay set after said step of transmitting said first parameters, failure to set up said second call after expiry of a second time-delay set after said step of clearing down said first call, absence of reception of said second parameters after expiry of a third time-delay set after said step of setting up said second call, and an error in said second parameters received in said terminal means.

3. A method as claimed in claim 2 wherein said error in said second parameters received by said terminal means is one of the following errors:

incorrect number of digits representing one of said second parameters, erroneous predetermined digit at one of ends of one of said second parameters, and an erroneous parameter out of said second parameters.

4. A method as claimed in claim 2 wherein said terminal means executes said following steps cyclically to test said cell periodically, cumulatively counts occurrences of each of said following incidents thereby providing cumulative counts of incident occurrences and produces an alarm if one of said cumulative counts exceeds a predetermined number during a predetermined period.

5. A method as claimed in claim 1 comprising a clearing down of said first call by said test mobile station in response to any of the following events:

absence of reception of said first parameters after expiry of a predetermined time-delay set by said test mobile station after said step of setting up said first call, and an error in one of said first parameters received in said test mobile station.

6. A method as claimed in claim 1 comprising a clearing down of said second call by said test mobile station in response to any of the following events:

anticipated termination of said second call before said step of emitting said second parameters from said test mobile station, and expiry of a predetermined time-delay set by said test mobile station after said step of emitting said second parameters.

7. A method as claimed in claim 1 wherein at least one of said first parameters received correctly by said test mobile station is one of said second parameters emitted from said test mobile station.

8. A method as claimed in claim 1 wherein:

said first parameters include at least one of following numbers: a number of said cell, a telephone number of said terminal means, a predetermined number identifying said terminal means, and a number identifying said first call, and said second parameters include at least one of following numbers: said number of said cell, said predetermined number identifying said terminal means, and said number identifying said first call.

9. A method as claimed in claim 1 wherein said first parameters are transmitted from said terminal means in the form of a sequence of digits in multifrequency code, and said second parameters are emitted from said test mobile station in the form of a sequence of digits in multifrequency code.

10. A method as claimed in claim 1 wherein said terminal means is connected via a switched telephone network to said fixed communication means.

11. A method as claimed in claim 1 wherein said terminal means executes said following steps cyclically for predetermined cells to be tested in said cellular telecommunication network.

* * * * *